United States Patent [19]

Shimokusuzono et al.

[11] Patent Number: 5,767,186
[45] Date of Patent: Jun. 16, 1998

[54] COMPOSITION FOR SEAL MEMBER FOR COMPRESSOR AND METHOD OF MANUFACTURING TIP SEAL FOR SCROLL TYPE COMPRESSOR

[75] Inventors: Takumi Shimokusuzono, Inabe-gun; Jiro Matsumoto, Yokkaichi, both of Japan

[73] Assignee: NTN Corporation, Osaka, Japan

[21] Appl. No.: 848,495

[22] Filed: May 8, 1997

Related U.S. Application Data

[63] Continuation of Ser. No. 416,322, Apr. 4, 1995, abandoned.

[30] Foreign Application Priority Data

Jun. 27, 1994 [JP] Japan ................................ 6-144588

[51] Int. Cl.$^6$ ........................................................ C08K 3/04
[52] U.S. Cl. ........................ 524/502; 524/514; 524/538; 524/609; 525/537
[58] Field of Search ............................ 524/514, 538, 524/502, 609; 525/537

[56] References Cited

U.S. PATENT DOCUMENTS

| | | | |
|---|---|---|---|
| 4,370,292 | 1/1983 | Yanase et al. | 525/537 |
| 4,935,473 | 6/1990 | Fukuda et al. | 525/537 |
| 5,131,827 | 7/1992 | Tasaka | 524/609 |
| 5,216,079 | 6/1993 | Crosby et al. | 525/130 |
| 5,494,300 | 2/1996 | Tanaka et al. | 277/227 |

*Primary Examiner*—Margaret W. Glass
*Attorney, Agent, or Firm*—Nikaido Marmelstein Murray & Oram, LLP.

[57] ABSTRACT

Compositions for a tip seal for a scroll type compressor are proposed which are low in friction coefficient, high fluidity in a molten state and highly durable in a compressor using a substitute Freon. The composition comprises 2–10 wt % of fluororesin, 5–20 wt % of carbon fiber, and 75–93 wt % of polyphenylene sulfide resin containing 90 mol % or more of a repeating unit represented by the formula:

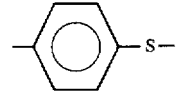

The composition has a melt viscosity of 1200–3000 poise. Also, a method of manufacturing a plurality of such tip seals simultaneously is proposed.

3 Claims, 6 Drawing Sheets

COMPOSITION FOR SEAL MEMBER FOR COMPRESSOR AND METHOD OF MANUFACTURING TIP SEAL FOR SCROLL TYPE COMPRESSOR

This application is a continuation of application Ser. No. 08/416,322 filed Apr. 4, 1995, now abandoned.

BACKGROUND OF THE INVENTION

This invention relates to a composition for a seal member mounted on a sliding surface of a scroll type compressor and a method of manufacturing a tip seal for the compressor.

We will explain the structure of an ordinary scroll type compressor with reference to FIGS. 1–4. A scroll type compressor comprises a plurality of scroll members 5 which include a base plate 3 made of a light metal such as aluminum or aluminum alloy, and a scroll wall 4 extending vertically from one side of the base plate 3 and made of the same material as the base plate. Formed in the top end face of the scroll wall 4 is a groove 6 (FIG. 3) in which is received a scroll seal member 1 (FIG. 2) made of a lubricating resin such as tetrafluoroethylene (hereinafter abbreviated to PTFE).

The scroll walls of the respective scroll members 5 extend scrolling in opposite directions to each other. A pair of the scroll members 5 are fitted together so that the scroll wall of one scroll member is inserted in the gap between the scroll wall of the other scroll member, with their axes offset from each other. In this state, they are rotated about their respective axes to move the closed space defined by the scroll walls 4 toward the center of the compressor. The fluid confined in the closed space is compressed and discharged from the central part of the compressor.

As shown in FIG. 4, the seal member 1, 1' of each of the scroll members 5 and 5' is in sliding contact with the bottom of the other scroll member 5' and 5 at the root of the scroll wall, thereby sealing fluid that flows the passage defined by the scroll walls 4.

Such seal members 1, formed mainly from PTFE, are low in productivity because they are not injection-moldable, and also low in creep resistance. It has therefore been proposed recently to form such seal members from an injection-moldable lubricating resin.

One of such seal members is disclosed in Unexamined Japanese Patent Publication 62-223488 filed by the inventors of the present application. The injection-moldable seal member for use in a scroll type compressor disclosed in this publication has a composition comprising aromatic polyether ketone resin, polyallylene sulfide resin and polyether imide resin as main components, with PTFE and injection-moldable fluorine-containing resins added. The seal member disclosed in Unexamined Japanese Patent Publication 63-158362, which was also filed by the inventors of the present application, contains as a main component an aromatic polyether ketone resin and aims to improve lubricating properties and creep resistance.

In a conventional method of manufacturing a tip seal from an injection moldable material, the material is injected into a metal mold through a gate arranged at the central portion of the scroll tip seal to be formed.

It is an ordinary practice to mold a plurality of tip seals simultaneously to improve the manufacturing efficiency.

In order to manufacture a plurality of such seals simultaneously, as shown in FIG. 14, a plurality of tip seal forming portions 21 are arranged in a metal mold on a horizontal plane. A spool 22 is provided between each pair of the adjacent forming portions 21 to supply resin material into forming portions 21 through runners 23 and gates 24. A plurality of tip seals 25 are thus formed simultaneously. The gates 24 are provided at substantially equal distances from the adjacent forming portions 21.

These seal members, which are mainly made of such heat-resistant resins as aromatic polyether ketone resin, polyallylene sulfide resin and polyether imide resin, with PTFE and fluorine-containing resin added, are injection-moldable and exhibit superior lubricity and creep resistance. But they have one problem in that they are low in fluidity in injection molding.

One problem with a composition for a seal member is that when injection-molding a long seal member having substantially the same length (20–60 cm) as the scroll wall of a scroll type compressor, it is necessary to provide a gate in a metal mold at the central portion of the entire length (when developed) of the seal member in order to inject the composition uniformly.

Further, as shown in FIG. 8, when forming a scroll tip seal 25 by injection molding with the gate arranged at the central portion of the tip seal, part of the gate is left in the tip seal to develop a projection 26. It is necessary to remove such a projection by additional working. Such additional working will lower production efficiency and thus increase the production cost.

Also, if such a projection 26 is not flattened sufficiently as shown in FIG. 9, fluid pressure in a hydraulic space 27 will act in the direction of arrow in the figure, thus lowering the sealing capacity.

Now let us consider problems related to the materials for conventional scroll tip seals. Tip seals are brought into contact with refrigerants such as Freon gases and lubricants containing various additives in a heated state while the compressor is in operation. Thus, their material degrades in such an environment and their wear resistance is not stable.

Also, it is necessary to take another problem into consideration when manufacturing such seal members. In order to protect the global environment, conventional Freons as refrigerants are now being replaced rapidly by more environmentally friendly substitutes such as 1, 1, 1, 2-tetrafluoroethylene (Freon R134a). With the transition from conventional Freons to substitute Freons, the conventional lubricant, Sunoco oil, which is made up of a mineral oil, is being replaced by polyalkylene glycols (hereinafter abbreviated to PAG).

PAG usually contains different kinds of additives to improve its extreme pressure properties. Also, due to rather high hygroscopicity of PAG, the seal member tends to be hydrolyzed at high temperature.

The conventional methods of manufacturing tip seals for scroll type compressors, in which a plurality of tip seals are manufactured simultaneously, has a problem in that the forming portions 21 (see FIG. 14) are arranged side by side on the same plane, two-dimensionally, so that a rather large metal mold is needed.

Also, since the gates are provided between the forming portions 21, as shown in FIG. 13, the flow A of synthetic resin is divided into two flows directed to both ends of each forming portion 21. As the flow is divided, a parting point B develops in the resin material. The tip seal 25 thus formed tends to be low in strength at the parting point. Such a tip seal is not durable enough.

An object of this invention is to solve the above problems, more particularly to provide a composition for a seal member of a scroll type compressor which is low in friction coefficient, high fluidity in a molten state, and highly durable (wear-resistant) when used in a compressor that uses a substitute Freon such as Freon R134a.

A second object of this invention is to provide a method of manufacturing a tip seal having high sealing performance and durability at low cost.

A third object of this invention is to provide a method of simultaneously manufacturing a plurality of tip seals having high strength, using a compact metal mold and preventing the flow of resin material from being divided.

SUMMARY OF THE INVENTION

According to this invention, there is provided a composition for a seal member of a scroll type compressor according to this invention comprises 2–10% by weight of a fluororesin, 5–20% by weight of a carbon fiber, and 75–93% by weight of a polyphenylene sulfide resin containing 90 mol % or more of a repeating unit represented by the formula:

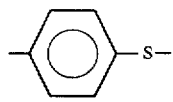

the composition having a melt viscosity of 1200–3000 poise as measured with a capillary rheometer having a capillary diameter of 1 mm, a capillary length of 10 mm, a barrel diameter of 9.55 mm, and a barrel length of 350 mm at the temperature of 320° C. and shear rate of $10^3$ sec$^{-1}$.

In order to attain the second object, there is provided a method of manufacturing a tip seal, characterized in that a gate for pouring the material into the metal mold is provided at outer peripheral end of the tip seal to be formed, and that the material is poured into the metal mold through the gate to mold the tip seal.

In order to attain the third object, there is provided a method of manufacturing a plurality of tip seals simultaneously, characterized in that a plurality of seal forming portions are arranged substantially concentrically, that a gate is provided at the central part of each of the plurality of tip seal forming portions so as to communicate with the inner ends of the forming portions, and that an injection moldable material is injected into the forming portions through the gates to mold the tip seals.

Also, the third object is attainable by providing the gate for injecting the material into the tip seal forming portions at the inner ends of the forming portions so that the material is injected in the longitudinal direction of the forming portions, and by injecting the material into the metal mold through this gate to mold the tip seal.

The following is a more detailed description of the invention.

The polyphenylene sulfide resin (hereinafter abbreviated to PPS resin) used in this invention has a crystalline linear high-molecular structure containing a repeating unit represented by the formula. Preferably, the PPS resin contains 90 mol % or more of the repeating unit. If below 90 mol %, the expected effects of the addition of PPS resin to the composition, such as high injection-moldability, would not appear.

Such PPS resin should preferably be a compound obtained from a polymer produced by reacting sodium sulfide and p-dichlorobenzene in an amide solvent such as N-methylpyrolidone or dimethylacetamide, or a sulfonic solvent such as sulfolane. Also, a copolymeric component expressed by the following formula may be added in an amount that will not affect the crystallizability of the polymer, e.g. in an amount of less than 10 mol %.

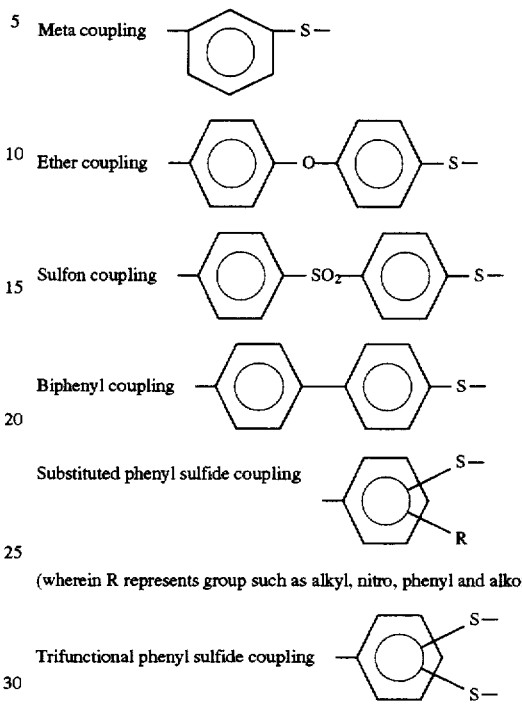

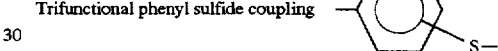

(wherein R represents group such as alkyl, nitro, phenyl and alkoxy)

Such PPS resin may be synthesized by the reaction of a halogen-substituted aromatic compound with an alkali sulfide as disclosed in Examined Japanese Patent Publication 44-27671, or by the condensation reaction in the presence of a thiophenolic alkaline catalyst or a copper salt as disclosed in U.S. Pat. No. 3,274,165.

Immediately after reaction such as condensation, PPS resin is a whitish uncrosslinked substance and will remain low in molecular weight and viscosity if left as it is. In order to increase its viscosity to a level suitable for melt forming, it has to be oxidized and crosslinked by heating it in air to a temperature lower than its melting point. Most commercially available PPS resins for melt forming are formed by oxidation-crosslinking.

The PPS resin used in this invention should be one which has a melt viscosity of 300–2500 poise as measured with a capillary rheometer having a capillary diameter of 1 mm, a capillary length of 10 mm, a barrel diameter of 9.55 mm, and a barrel length of 350 mm at the temperature of 300° C. and shear rate of $10^3$ sec$^{-1}$, when it has a straight-chain molecular structure after polymerization. Namely, the melt viscosity is measured using a flow tester having an orifice 1 mm in diameter and 10 mm long under the load of 20 kgf/cm$^2$ and at the temperature of 300° C., after six-minute preheating.

If the melt viscosity of the PPS resin as measured under the above conditions were less than 300 poise, its wear resistance and mechanical properties at high temperatures would be too low to be acceptable. If higher than 2500 poise, its fluidity when forming would become so high that it would be very difficult to form a seal member from such PPS resin.

Such a PPS resin may be a straight-chain PPS resin obtained by polymerization (so-called linear PPS), or a PPS resin obtained by crosslinking the linear PPS resin (linear crosslinked PPS).

But the linear crosslinked PPS is liable to make the entire composition brittle, though depending on the contents of components forming the composition. A seal member formed from such a brittle composition can be tipped at its sliding surface if foreign materials exist in the sliding contact portion. Thus, it is preferable to use a linear PPS resin having improved tensile strength and bending strength. Commercially available linear PPS resins which meet this requirement include LN-2 (1000 poise) made by Tohpren. As a linear crosslinked PPS resin, T4AG (2000 poise) is commercially available also from Tohpren.

The content of the PPS resin in the seal member composition according to this invention should be 75–93% by weight. If less than 75% by weight, it would be difficult to form a seal member for a scroll type compressor which is sufficiently long while keeping a sufficiently small area.

According to the present invention, a fluororesin is added to the composition to give it low friction coefficient and tackiness. The kind of fluororesin used should be determined so that the friction coefficient will be suitable for the designed performance of the compressor. Fluororesins which can effectively reduce the friction coefficient include PTFE, polytetrafluoroethylene-hexafluoropropylene copolymer, polytrichlorofluoroethylene, tetrafluoroethylene-perfluoroalkylvinylether copolymer. Among them, PTFE has the lowest friction coefficient and thus is most desirable. It should be used in the form of powder having an average particle diameter of 20 μm or less.

Commercially available PTFE's in the form of such fine powder include FLUON (trademark) L169, L170 and L171 made by I.C.I. in U.K.; LUBLON (trademark), L-2 and LD-1 made by Daikin; and Teflon (trademark), TLP-10, TLP-10F-1 made by Dupont.

Recycled PTFE, i.e. baked and pulverized PTFE, is more desirable than virgin PTFE in order for the composition to maintain its high melt viscosity, because recycled PTFE is more difficult to become fibrous. However, instead of such recycled PTFE or together with it, PTFE powder irradiated with ∂-rays to reduce its molecular weight may be used. Commercially available ∂-ray irradiated PTFE's for use as lubricants include KT400H made by Kitamura Co.

The content of the fluororesin should be 2–10% by weight. If less than 2% by weight, the lubricity of the composition for a seal member would be insufficient. If more than 10% by weight, desired melt fluidity would not be attainable.

Carbon fibers used in this invention should have an average diameter of 1–20 μm, preferably 10–18 μm. Their aspect ratio should be 1–80, preferably 5–50.

Carbon fibers having an average fiber diameter of less than 1 μm have a problem in that they do not disperse uniformly in the composition because they have a tendency to flocculate. Carbon fibers of more than 20 μm diameter would abrade the mating member which is made of aluminum alloy. If their aspect ratio were less than 1, the mechanical properties of the matrix would be insufficient because such carbon fibers cannot reinforce the matrix. Carbon fibers having an aspect ratio of more than 80 will not disperse uniformly when mixed into the composition and thus would lower the quality of the composition in wear-resistance.

The content of carbon fibers should be 5–20% by weight. If less than 5% by weight, the mechanical strength and wear resistance would not be improved. If more than 20% by weight, marked drop in the melt fluidity of the composition would result.

The aromatic polyamide fiber used in this invention is formed from one of the resins having repeating units represented by the following formulas. Of these resins, typical aromatic polyamide resins having meta-structures include NOMEX (paper-form) made by Dupont, and CONEX made by Teijin. Typical such resins having para-structures include KEVLAR (fibrous) made by Dupont, and TECHNORA made by Teijin.

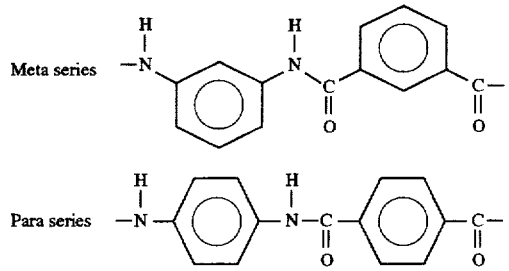

The aromatic polyamide fibers should preferably have an average length of 0.2–1 mm and diameters of 10–15 μm. Fibers that are shorter and finer than the above values are low in flowability in the composition, so that extremely long time and much energy would be needed to uniformly disperse such fibers. Fibers that are longer and thicker than the above values are difficult to disperse uniformly in the matrix, so that the mechanical strength and wear resistance would be low.

Commercially available aromatic polyamide fibers that satisfy these requirements include TWARON (para) made by Akzo (fiber length: 0.25 mm, fiber diameter 13 μm).

By adding such aromatic polyamide fibers to the seal member composition according to this invention, it is possible to improve the wear resistance of the composition. If their content were less than 3% by weight, the wear resistance would be insufficient. If more than 10%, the melt fluidity of the composition when forming it would be poor.

The composition formed from the above-mentioned components will exhibit a melt viscosity of 1200–3000 poise as measured with a capillary rheometer having a capillary diameter of 1 mm, a capillary length of 10 mm, a barrel diameter of 9.55 mm and a barrel length of 350 mm at a temperature of 320° C. and a shear rate of $10^3$ sec$^{-1}$.

The melt viscosity of the composition varies with the grade of melt viscosity of the PPS resin, the contents of carbon fibers and aromatic polyamide fibers, and the contents of other additives. It is not dependent upon only the contents of the essential components.

If the melt viscosity is less than 1200 poise, the resin composition is more likely to flow back or drip from the nozzle during the forming step, thus making difficult precise weighing and/or continuous forming. If more than 3000 poise, the fluidity during forming would be too low to be acceptable.

In order to improve self-lubricity, mechanical strength and thermal stability of the composition, other additives such as solid lubricants may be added to the composition in such amounts as not to impair the object of this invention. Also, pigments may be added for coloring.

These components can be mixed by a known method such as by dry blending using a Henschel mixer or a tumbler mixer or in a Brabender mixer or an extruder.

The composition for a seal member for use in a scroll type compressor according to this invention is made up of predetermined amounts of a fluororesin, a carbon fiber and a PPS resin having a predetermined melt viscosity. Such a composition shows desired frictional properties, fluidity in a molten state, and wear resistance. A seal member formed from such a composition shows good durability when used in a compressor that uses a substitute Freon such as Freon 134a.

It is possible to further improve the wear resistance and mechanical strength of the composition by using a PPS resin having a predetermined melt viscosity and adding a predetermined amount of aromatic polyamide fibers.

In the method of manufacturing a tip seal according to this invention, a gate for injecting the material for the tip seal into the metal mold is provided at outer peripheral ends of the scroll tip seal to be formed. With this arrangement, it is possible to prevent the formation of projections at intermediate portion of the tip seal. Thus, no gap is formed in the sealing surface, so that it can maintain high sealing capacity. Projections may be formed on the outer peripheral ends of the tip seal. But such projections would not have little influence on its sealing capacity by making longer the sealing length of the tip seal.

In another arrangement, a plurality of tip seal forming portions are arranged substantially concentrically, so that it is possible to manufacture a plurality of tip seals without using a large metal mold. By injecting the resin material from the inner end of the each tip seal forming portion, it is possible to prevent the formation of parting point at which the flow of resin is divided. The tip seal thus formed shows high durability.

Other features and objects of the present invention will become apparent from the following description made with reference to the accompanying drawings, in which:

DETAILED DESCRIPTION OF THE PREFERRED EMBODIMENT

Materials used in Examples and Control Examples are listed below:

(1) PPS resin (linear type; melt viscosity after polymerization (in straight-chain form): 1000 poise): LN-2 made by Tohpren (2) PPS resin (linear crosslinked type: melt viscosity after polymerization (in straight-chain form): 2000 poise): T-4AG made by Tohpren (3) PPS resin (linear type: melt viscosity after polymerization (in straight-chain form): 6000 poise) : LC-6 made by Tohpren (4) Carbon fiber M207S made by Kureha Chemical; average fiber diameter: 18 μm; aspect ratio: 48

(5) Polytetrafluoroethylene (PTFE)

KT400H made by Kitamura Co.

(6) Aromatic polyamide fiber (aramid fiber)

TWARON made by Akzo; fiber length: 0.25 mm; fiber diameter: 13–14 μm (7) Liquid crystal polymer SUMICA SUPER E4000 made by Sumitomo Chemical (EXAMPLES 1–6 AND CONTROL EXAMPLES 1–8)

Figure 1:
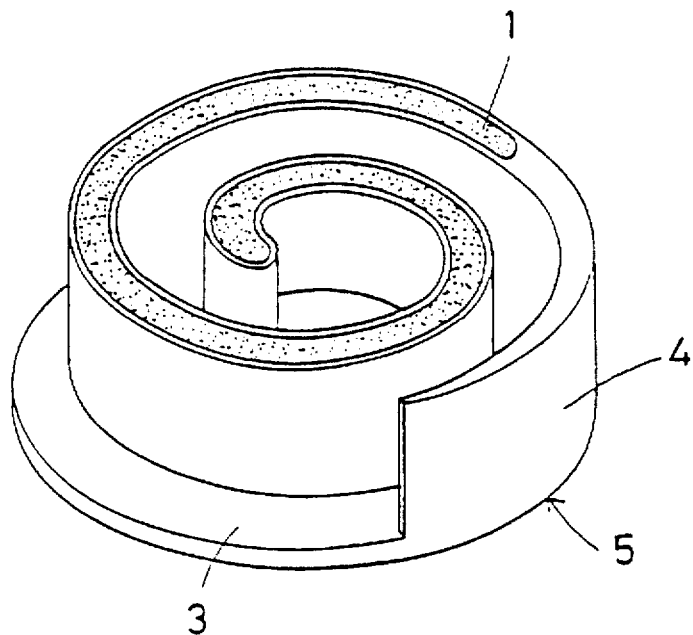
FIG. 1 is a perspective view of a scroll member of a scroll type compressor.
Figure 2:
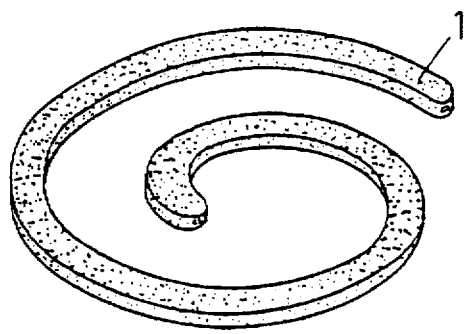
FIG. 2 is a perspective view of a seal member shown in FIG. 1.

Materials 1–6 were put in a Henschel mixer in the amounts shown in Table 1 and mixed together. The mixtures thus obtained were then fed into a twin-screw melt extruder (type PCM-30 made by Ikegai Tekko) and extruded through a strand die having seven holes (2 mm diameter) at a temperature of 290°–310° C. with the screw revolution kept at 100–150 rpm to granulate the mixtures into pellets. The pellets thus formed were injection-molded with an injection molder at a nozzle temperature of 290°–320° C., a metal mold temperature of 130°–150° C. and an injection pressure of 1500–2000 kgf/cm$^2$ to form a seal member 2 as shown in FIG. 2.

Also, test pieces of a predetermined shape were molded under exactly the same conditions as the above-mentioned. They were subjected to the following tests.

(Durability test when exposed to refrigerants)

PAG (water content: 1% by weight) was fed into a pressure-resistant stainless container accommodating the test pieces. Then, CH2F-CF3 (1, 1, 1, 1, 2-tetrafluoroethylene as a substitute Freon was charged under pressure into the container until the inner pressure reaches 30 kgf/cm$^2$ at 180° C. This state was maintained at 180° C. for 500 hours.

Figure 3:
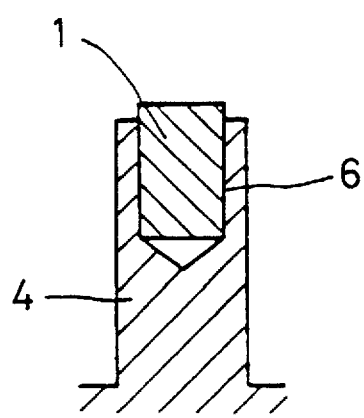
FIG. 3 is a vertical sectional view of a portion of the scroll member of FIG. 1.
Figure 4:
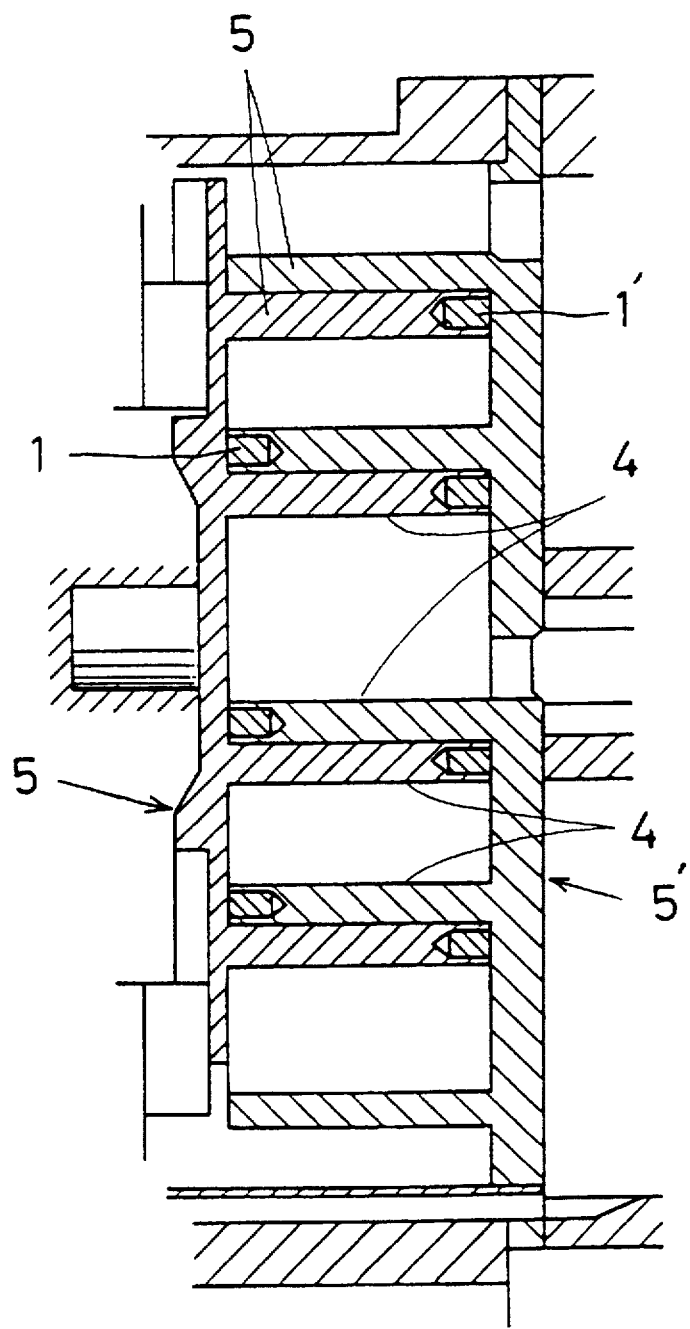
FIG. 4 is a sectional view of a pair of scroll members assembled together.

Test pieces corresponding to Examples 1–6 and Control Examples 1–6 were tested for friction coefficients, amounts of wear and fluidity. Also, the bending strength of Control Examples 7 and 8 was measured before and after immersing them in the abovementioned refrigerant for 500 hours. The results are shown in FIG. 3.

(Friction coefficient and amount of wear)

In this test, test pieces in the form of wear rings having an inner diameter of 17 mm, an outer diameter of 21 mm and a length of 10 mm (which were formed from the test pieces used in the above durability test) were abraded against a mating member made of FC 25 to measure the friction coefficient and the amount of wear using a Suzuki-Matsubara type friction/wear tester at a pressure of 15 kgf/cm$^2$ and a rate of 128 meters per minute. The amounts of wear were calculated from the difference (in μm) in heights of the test pieces before and after the test. The results of measurements are shown in Tables 1 and 2.

(Fluidity test)

By use of an involutely curved metal mold having a rectangular section of 1.7 mm in width and 1.5 mm in thickness, the test pieces were subjected to a scroll flow test using PROMAT made by Sumitomo Juki to measure the flow length (cm). The results are shown in Tables 1 and 2.

As will be apparent from the results shown in Tables 1 and 2, Control Example 1, of which the carbon fiber content is over the predetermined range, was too high in melt viscosity and thus too low in moldability, though its wear resistance was comparatively good.

Control Example 2, which contained no fluororesin, was too high in friction coefficient. Control Example 3, which contained no reinforcing carbon fibers, had inferior wear resistance. Control Example 4, which contained aromatic polyamide fibers in an amount exceeding the predetermined range, was higher in melt viscosity than the predetermined upper limit and thus the flowability was too low.

In Control Example 5, the melt viscosity of the PPS resin was higher than the predetermined upper limit though its content was within the predetermined range, so that the melt viscosity of the entire composition was higher than the predetermined range and thus its flowability was low. In Control Example 6, the liquid crystal polymer was low in oil resistance when exposed to PAG, so that the composition degraded easily by hydrolysis.

Also, as shown in Table 3, a liquid crystal polymer having a high fluidity when melted (Control Example 6) was low in oil resistance when exposed to refrigerator oils.

In contrast, Examples 1–6, which satisfy all the requirements including the contents and the melt viscosity, showed high chemical resistance to substitute Freons because their main component is a PPS resin. As the compositions for seal members, their wear resistance, friction coefficient, moldability in a molten state (flow length and melt viscosity) were all satisfactory.

(EXAMPLE 7)

Figure 5:
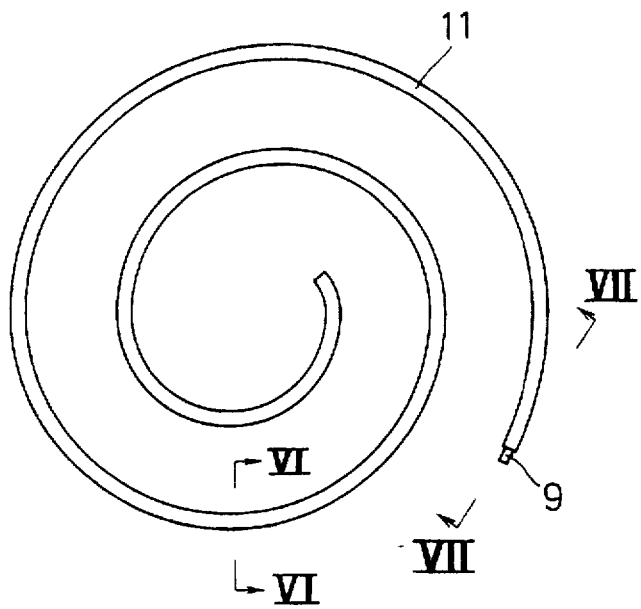
FIG. 5 is a plan view of a tip seal manufactured according to the method of Example 7.
Figure 6:
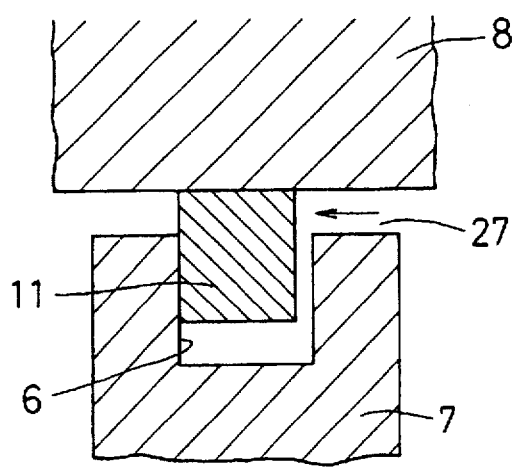
FIG. 6 is an enlarged sectional view taken along arrow VI—VI of FIG. 5, showing its state in use.
Figure 7:
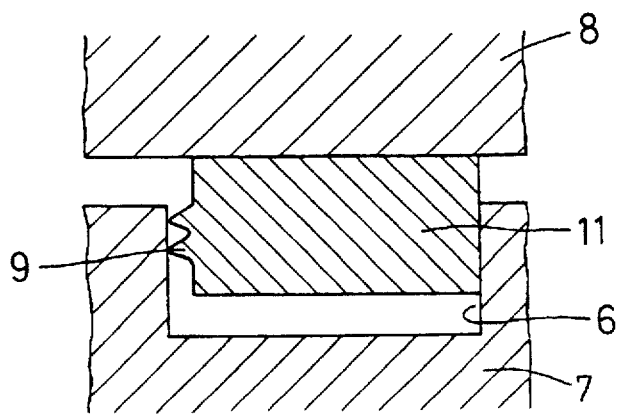
FIG. 7 is an enlarged sectional view taken along arrow VII—VII of FIG. 5, showing another state of use.
Figure 8:
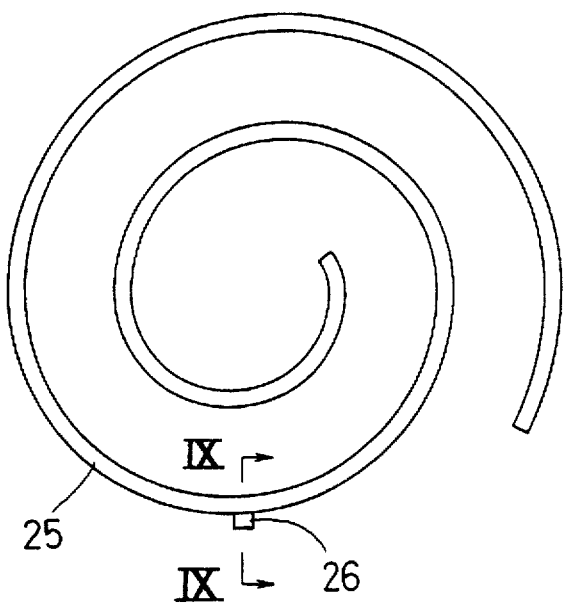
FIG. 8 is a plan view of a tip seal in the prior art.
Figure 9:
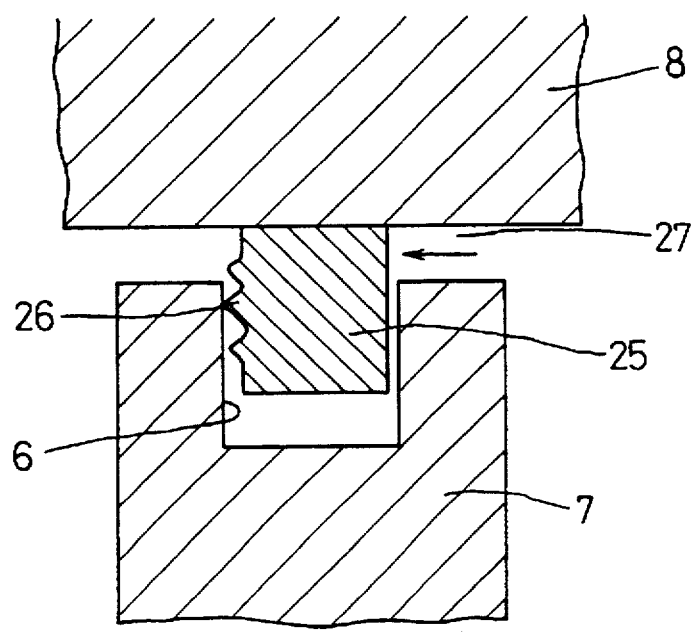
FIG. 9 is an enlarged sectional view taken along arrow IX—IX of FIG. 8, showing its state in use.

Description is now made of Example 7, which concerns a method of manufacturing a tip seal for a scroll type compressor, with reference to FIGS. 5–7.

As shown in FIG. 5, in the metal mold used in the method of manufacturing a tip seal 11 for use in a scroll type compressor, a gate for injecting an injection moldable material is provided at outer peripheral end of the tip seal 11 yet to be formed.

We manufactured a scroll tip seal 11 as shown in FIG. 5 by injecting an injection moldable resin such as a liquid crystal polymer into the mold through this gate.

Since the gate is provided at the outer peripheral end of the tip seal 11, the seal 11 develops no projections on its outer peripheral surface. Thus, when a fixed scroll 7 and a movable scroll 8 are assembled with the seal of this example mounted in the groove 6 as shown in FIG. 6, no gap was formed at the sealing surface and thus the sealing capacity was kept high.

If projections 9 are formed (FIG. 5) on the outer peripheral end when separating the gate from the tip seal, the sealing length of the tip seal will become shorter by the length of the projections when the seal is mounted between the fixed scroll 7 and the movable scroll 8 (FIG. 7). But this problem can be solved simply by forming a tip seal 11 to a length longer by the length equal to the height of the projections 9.

(EXAMPLES 8 AND 9)

Figure 10:
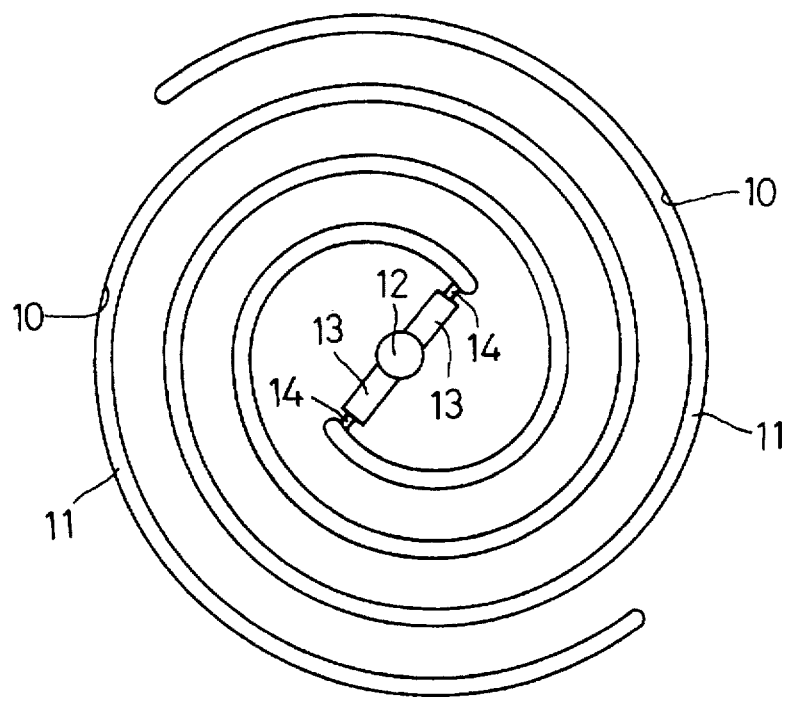
FIG. 10 is a plan view showing a manufacturing method of Example 8.
Figure 11:
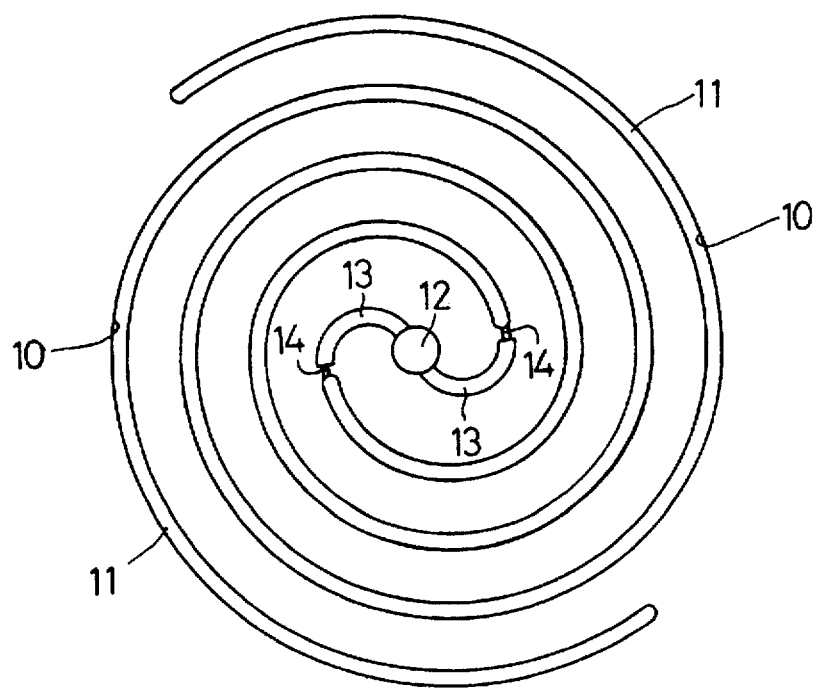
FIG. 11 is a plan view showing a manufacturing method of Example 9.
Figure 12:
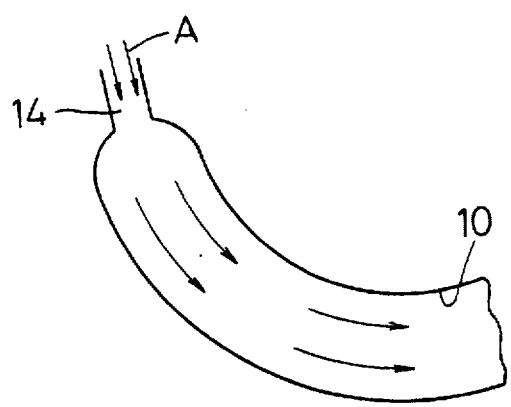
FIG. 12 is a schematic view showing the flow of material near the gate in Example 9.
Figure 13:
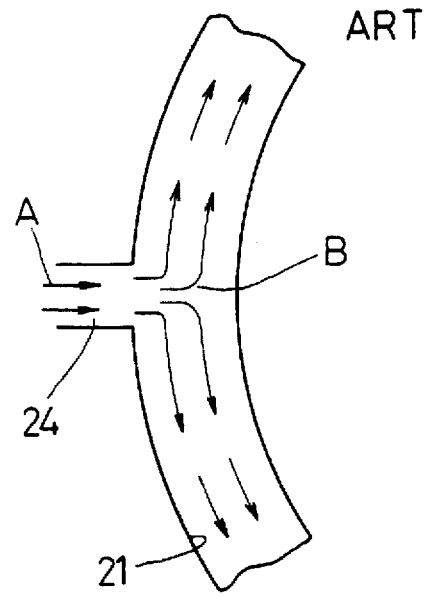
FIG. 13 is a schematic view showing the flow of material near the gate of the prior art.
Figure 14:
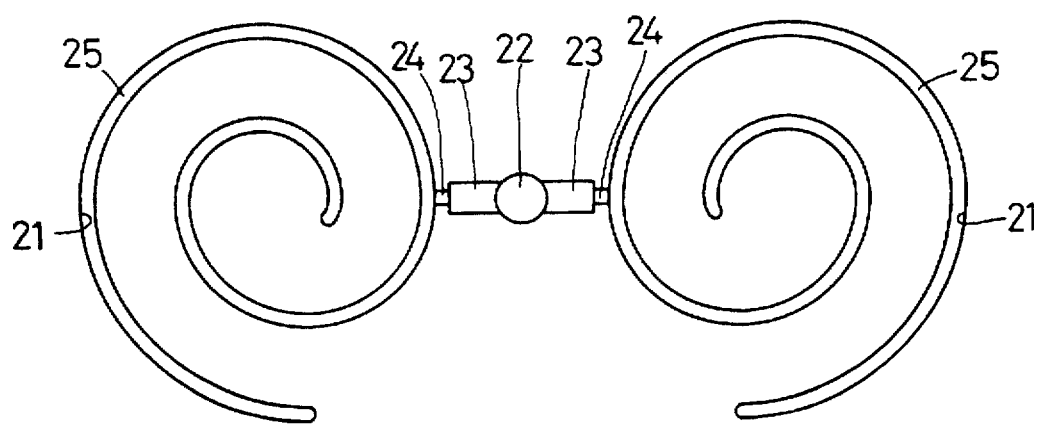
FIG. 14 is a plan view showing a conventional manufacturing method.

FIGS. 10 through 12 shows Examples 8 and 9, which concern methods for manufacturing tip seals for scroll type compressors according to the present invention.

In Example 8 shown in FIG. 10, and Example 9 shown in FIG. 11, a plurality of tip seal forming portions 10 are arranged spirally and substantially concentrically in a metal mold for manufacturing tip seals 11 for use in scroll type compressors. At the center of the set of forming portions 10, there are provided a spool 12 for feeding a resin material, runners 13 connected to the spool 12, and gates 14 connecting the runners 13 to the forming portions 10.

In Example 8 shown in FIG. 10, the gates 14 communicate with the inner ends of the forming portions 10 at their inner peripheral side.

In Example 9 shown in FIG. 11, the runners 13 are arcuately shaped to inject the material through the gates 14 into the forming portions 10 in a longitudinal direction.

We manufactured two tip seals simultaneously by injecting an injection moldable resin such as a liquid crystal polymer into the forming portions 10 of the metal molds shown in FIGS. 10 and 11 through the spool 12.

In these Examples, since the gates 14 are provided at the inner ends of the forming portions 10, the resin material A injected into the forming portions 10 flows in a longitudinal direction as shown in FIG. 12, so that no parting point is formed in the flow of resin. The scroll tip seals 11 thus formed had uniform strength over their entire length and thus showed improved durability.

TABLE 1

| Item | Example Number | | | | | |
|---|---|---|---|---|---|---|
| | 1 | 2 | 3 | 4 | 5 | 6 |
| Material content (wt %) | | | | | | |
| PPS (LN-2) (1) | 85 | 78 | 75 | 80 | 75 | — |
| PPS (T4AG) (2) | — | — | — | — | — | 85 |
| PPS (LC-6) (3) | — | — | — | — | — | — |
| Carbon fiber (4) | 5 | 20 | 15 | 12 | 10 | 5 |
| PTFE (5) | 10 | 2 | 10 | 5 | 5 | 10 |
| Aramid fiber (6) | — | — | — | 3 | 10 | — |
| Liquid crystal polymer (7) | — | — | — | — | — | — |
| Flow length (cm) | 35 | 29 | 29 | 30 | 29 | 32 |
| Melt viscosity (poise) | 1200 | 2300 | 2200 | 2000 | 3000 | 1800 |
| Wear resistance (µm) | 8 | 2 | 6 | 5 | 3 | 6 |
| Friction coefficient | 0.05 | 0.08 | 0.05 | 0.07 | 0.06 | 0.05 |

TABLE 2

| Item | Comparative example Number | | | | | | | |
|---|---|---|---|---|---|---|---|---|
| | 1 | 2 | 3 | 4 | 5 | 6 | 7 | 8 |
| Material content (wt %) | | | | | | | | |
| PPS (LN-2) (1) | 70 | 80 | 86 | 75 | — | — | — | — |
| PPS (T4AG) (2) | — | — | — | — | — | — | 100 | — |
| PPS (LC-6) (3) | — | — | — | — | 85 | — | — | — |
| Carbon fiber (4) | 25 | 20 | 4 | 10 | 5 | 5 | — | — |
| PTFE (5) | 5 | — | 10 | 3 | 10 | 10 | — | — |
| Aramid fiber (6) | — | — | — | 12 | — | — | — | — |
| Liquid crystal polymer (7) | — | — | — | — | — | 85 | — | 100 |
| Flow length (cm) | 14 | 28 | 32 | 22 | 14 | 58 | — | — |
| Melt viscosity (poise) | 3200 | 2200 | 1200 | 3600 | 3800 | 1200 | — | — |

TABLE 2-continued

| | Comparative example Number | | | | | | | |
|---|---|---|---|---|---|---|---|---|
| Item | 1 | 2 | 3 | 4 | 5 | 6 | 7 | 8 |
| Wear resistance (μm) | 4 | 9 | 14 | 3 | 4 | * | — | — |
| Friction coefficient | 0.06 | 0.11 | 0.08 | 0.06 | 0.05 | * | — | — |

* Impossible to measure because the test piece broke up.

TABLE 3

| Number | Material | Bending strength* | Bending strength retention rate |
|---|---|---|---|
| Comparative example | | | |
| 7 | (1) PPS | | |
| | Before immersing | 1280 | — |
| | After immersing | 1350 | 105% |
| 8 | (6) Liquid crystal polymer | | |
| | Before immersing | 1270 | — |
| | After immersing | ** | — |

*in kgf/mm²
** Impossible to measure because the test material did not keep its shape after 500 hours.

What is claimed is:

1. A composition for a seal member for use in a scroll type compressor, said composition comprising 2–10% by weight of a fluororesin comprising recycled polytetrafluoroethylene, formed by baking and pulverizing polytetrafluoroethylene, 5–20% by weight of carbon fiber having an average diameter of 10–20 μm, and 75–93% by weight of a linear polyphenylene sulfide resin having a melt viscosity of 300–1000 poise at the temperature of 300° C. containing 90 mol % or more of a repeating unit represented by the formula:

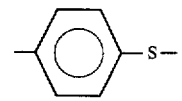

said composition having a melt viscosity of 1200–3000 poise as measured with a capillary rheometer having a capillary diameter of 1 mm, a capillary length of 10 mm, a barrel diameter of 9.55 mm, and a barrel length of 350 mm at the temperature of 320° C. and shear rate of $10^3$ sec$^{-1}$.

2. A composition for a seal member for use in a scroll type compressor as claimed in claim 1 comprising 3–10% by weight of an aromatic polyamide fiber.

3. A composition for a seal member for use in a scroll type compressor as claimed in claim 1 or 2 wherein said scroll type compressors is of a type that uses 1, 1, 1, 2-tetrafluoroethylene as a refrigerant and polyalkylene glycol as a lubricant.

* * * * *